Feb. 3, 1931.   W. E. TOMLINSON   1,791,175
FEEDING DEVICE
Filed Jan. 24, 1929
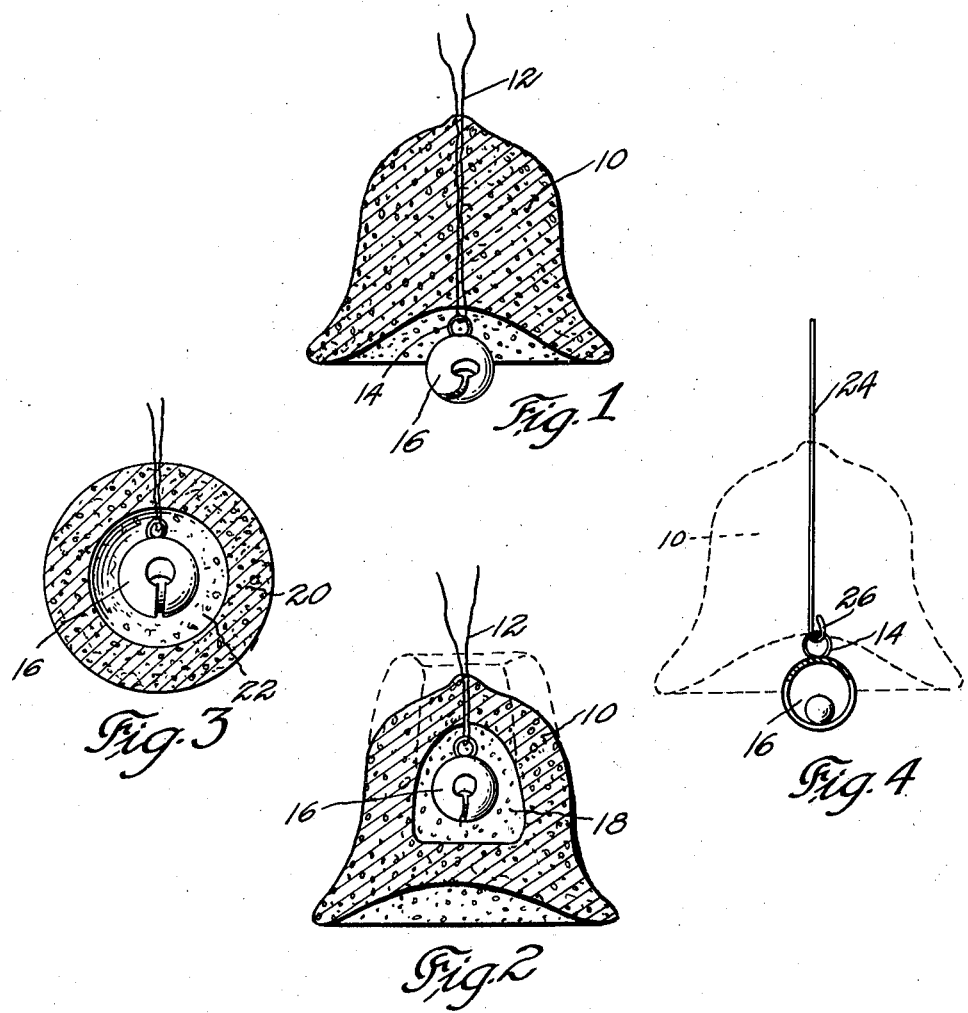
INVENTOR
William E. Tomlinson
BY
ATTORNEY Patented Feb. 3, 1931

1,791,175

UNITED STATES PATENT OFFICE

WILLIAM E. TOMLINSON, OF DEARBORN, MICHIGAN

FEEDING DEVICE

Application filed January 24, 1929. Serial No. 334,636.

This invention relates to a feeding device and more particularly to a device for stimulating exercise and song. It is an important object of my invention to compress into a solid mass food, such as seeds, ground bone, etc., and to suspend such a mass within reach of an animal or bird, for example in a cage for a bird.

Another object of the invention is to combine with such a mass a sound producing device, such as a bell, the bell producing a sound when the mass is disturbed by the feeding of the animal or pet.

Other objects and advantages of the invention will more fully appear from the following description taken in connection with the accompanying drawing, in which:

Fig. 1 is a sectional view through a compressed food mass, showing a preferred form of my invention.

Fig. 2 is a sectional view showing a modification of my device in which a bell is suspended within the food mass.

Fig. 3 is a sectional view showing another form of my device in which the sound producing device is suspended within a sphere.

Fig. 4 is a view illustrating a modified form of a common supporting means for the food and a bell, the bell being shown in section.

Referring to the drawing wherein I have illustrated my invention, the reference numeral 10 designates a mass of compressed food, preferably bird seed with other compounds such as ground bone, yeast, etc. In the forms of my invention as shown in Figs. 1 and 2, the mass is formed of generally bell shaped formation and a string 12 looped through an eye 14 of a bell 16 is moulded in the center of the mass 10 forming a means for conveniently securing the mass 10 and bell 16 to a support, for example a bird cage. The bell as shown in Fig. 1 is partially suspended within the lower face of the mass 10 giving the entire appearance of a bell, the bell proper forming the clapper.

If it is desired to conceal the bell within the mass, the mass may be formed of generally cup shaped formation as shown in dotted lines, and while in a plastic state the bell is suspended within the open end and the edges of the mass are formed around the string 12 securely holding the bell within the space 18.

As shown in Fig. 3, the mass 20 is formed spherical with the bell 16 suspended in an open space 22 of the sphere.

In Fig. 4 I have illustrated another form of securing means in which a single wire 24 is provided with a hook 26 to receive the ring 14 of the bell 16 and the food is moulded around the wire 24. A portion of the wire extends beyond the upper surface of the mass to be bent around a suitable support.

It will be understood that when such a device is suspended within a bird cage, for example, the bird therein will pick the mass 10 causing it to swing and thereby ring the bell 16. Such a device not only promotes exercise but encourages singing, the bird trying to imitate the sound of the bell.

It will be understood that various changes, including the size, shape and arrangement of parts, may be made without departing from the spirit of my invention and it is not my intention to limit its scope other than by the terms of the appended claims.

I claim:

1. A device of the class described comprising a mass of compressed food in combination with a sound producing device centrally suspended from the lower surface of said mass.

2. A device of the class described comprising a mass of compressed food in combination with a bell suspended from and partially within the lower surface of said mass.

3. A device of the class described comprising in combination a mass of compressed bird seed and a sound producing device partially within and suspended from the lower surface of said mass.

4. A device of the class described comprising in combination a congealed mass of bird food, a sound producing device and common means for suspending said mass and said device.

5. A device of the class described comprising in combination a congealed mass of bird seed of generally bell shape formation, a bell and common means for suspending said mass and said bell, said bell being suspended at the lower surface of said mass.

WILLIAM E. TOMLINSON.